(12) United States Patent
Lemen et al.

(10) Patent No.: US 9,752,490 B2
(45) Date of Patent: Sep. 5, 2017

(54) EXHAUST RETENTION SYSTEM AND METHOD OF MERCHANDISING

(71) Applicants: Scott Lemen, Gallatin, TN (US); Raymond L Ellison, Central City, KY (US)

(72) Inventors: Scott Lemen, Gallatin, TN (US); Raymond L Ellison, Central City, KY (US)

(*) Notice: Subject to any disclaimer, the term of this patent is extended or adjusted under 35 U.S.C. 154(b) by 568 days.

(21) Appl. No.: 14/459,253

(22) Filed: Aug. 13, 2014

(65) Prior Publication Data

US 2015/0058122 A1 Feb. 26, 2015

Related U.S. Application Data

(60) Provisional application No. 61/869,290, filed on Aug. 23, 2013.

(51) Int. Cl.
*F01N 13/18* (2010.01)
*G06Q 30/02* (2012.01)

(52) U.S. Cl.
CPC ..... *F01N 13/1805* (2013.01); *G06Q 30/0256* (2013.01); *G06Q 30/0273* (2013.01); *G06Q 30/0277* (2013.01); *F01N 2450/18* (2013.01); *F01N 2450/24* (2013.01); *Y10T 29/49947* (2015.01)

(58) Field of Classification Search
CPC ..... F16B 7/0413; F16L 3/1008; F16L 3/1041; F16L 55/005; F01N 13/1805; E05C 17/30; Y10T 403/32491; F16F 9/0281
USPC ........... 24/298–302; 40/606.11, 606.12, 913, 40/915, 316; 285/114, 117
See application file for complete search history.

(56) References Cited

U.S. PATENT DOCUMENTS

| | | | |
|---|---|---|---|
| 5,331,718 A * | 7/1994 | Gilbert | E05C 17/30 16/82 |
| 5,873,608 A * | 2/1999 | Tharp | F16L 55/005 285/114 |
| 2003/0089005 A1* | 5/2003 | Caveney | G09F 3/02 40/316 |

* cited by examiner

*Primary Examiner* — Jack W Lavinder
(74) *Attorney, Agent, or Firm* — Chris Tanner, Esq.; TannerPatent.com (57) ABSTRACT

An apparatus and method for an exhaust retention system is disclosed.

16 Claims, 9 Drawing Sheets

FIG. 6 swageless eyelet 304S swaged eyelet 304D modified eyelet 304M shorter neck   thinner head

EXHAUST RETENTION SYSTEM AND METHOD OF MERCHANDISING

CROSS REFERENCE TO RELATED APPLICATIONS

This application claims priority to U.S. Application No. 61/869,290, filed on Aug. 23 2013, the entire contents of which are hereby incorporated by reference.

BACKGROUND OF THE INVENTION

In the field of hot rods used for racing, it is advantageous to attach collectors to a header. However, in the event of some type of collision or malfunction, the collector can become disengaged from the header, and potentially disengaged from the entire hot rod vehicle. Such an event could also occur while the hot rod is being operated at a high speed. Further, during operation, a collector can become very hot. When a collector becomes disengaged, the result can be a large, uncontrollable piece of hot metal being ejected from a hot rod at very high speed and temperature, and potentially coming in contact with either the audience or pit crew. It is desired to avoid such a destructive event. Consequently, a mechanism for improving safety in use of hot rods is desired.

DETAILED DESCRIPTION OF THE PREFERRED EMBODIMENTS

Before explaining the disclosed embodiment of the present invention in detail it is to be understood that the invention is not limited in its application to the details of the particular arrangement shown, since the invention is capable of other embodiments. Also, the terminology used herein is for the purpose of description and not of limitation.

FIGS. 1-5 shows two non-limiting exemplary embodiments of an exhaust retention system 100. Within FIG. 1 a tether 100 comprises a cable 104, clamps $108_E$ (exhaust) and $108_H$ (header); and a sleeve 112. The embodiments disclosed herein, are intended to accommodate a variety of sizes and diameters of both header and exhaust system, as well as a variety of distances therebetween.

The exhaust retention system 100 is not the primary connection between the header and exhaust, but instead is secondary and not under tension. To facilitate this, the tether component is implemented in the form of a cable 104. FIGS. 1-5 shows an exemplary cable 104 and a sleeve 112. The sleeve 112 can be made of a specific color or dimension in order to quickly and visibly signify to a user that the tether 100 is of a specific type that is accepted by a governing body, such as but not limited to the National Hot Rod Association (NHRA). Further, advertising, promotional, or other information can also be imprinted onto the sleeve 112.

The system 100 comes in specific lengths of cable and clamp sizes, such as 5, 10, 15, and 20 inch cable sections, but also can be in a cut-to-fit embodiment. In the cut-to-fit arrangement, a user/installer would attach the eyelet 304 to the cable 104 themselves, using either a swaged 304D or swageless eyelet 304S.

Figure 1:
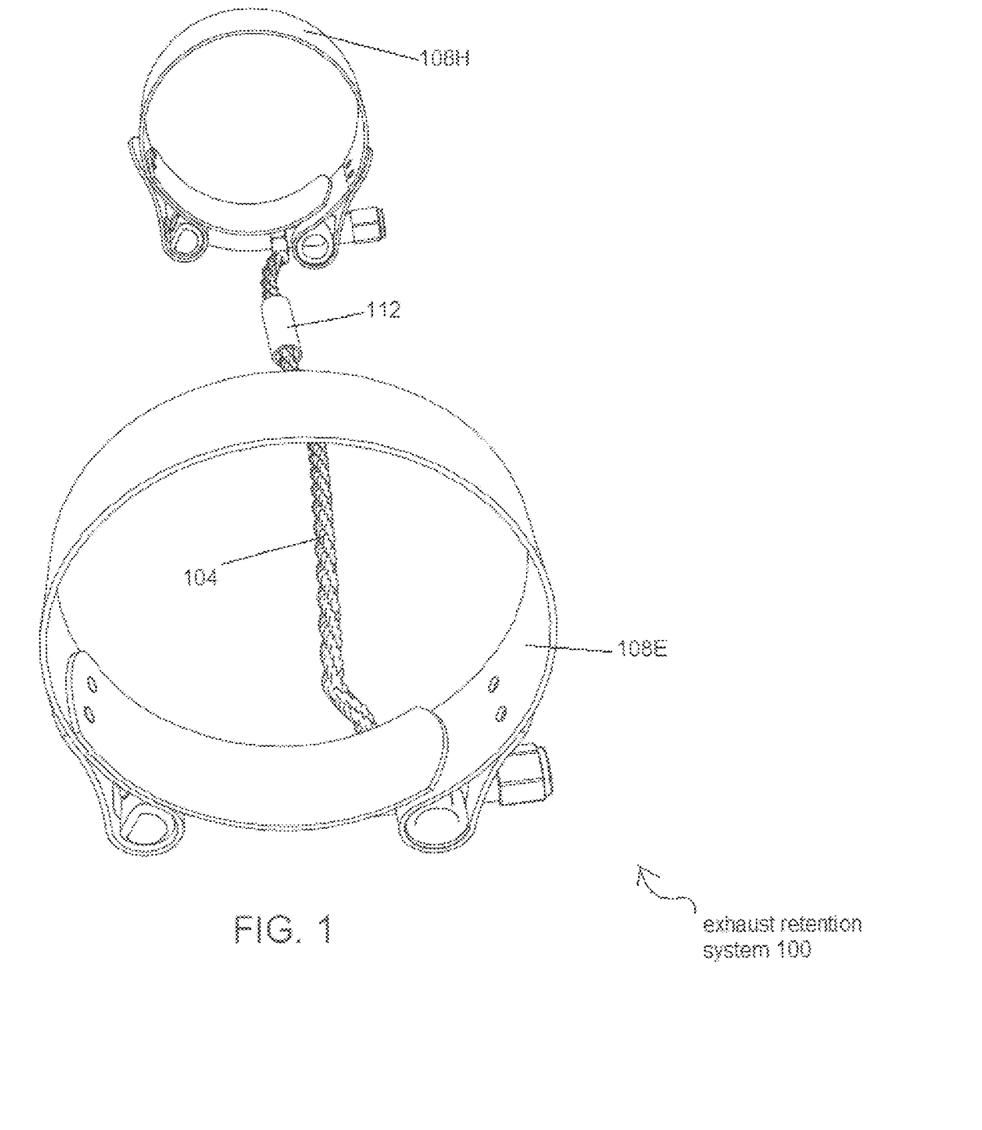
FIGS. 1-5 shows an embodiment of an exhaust retention system.
Figure 2:
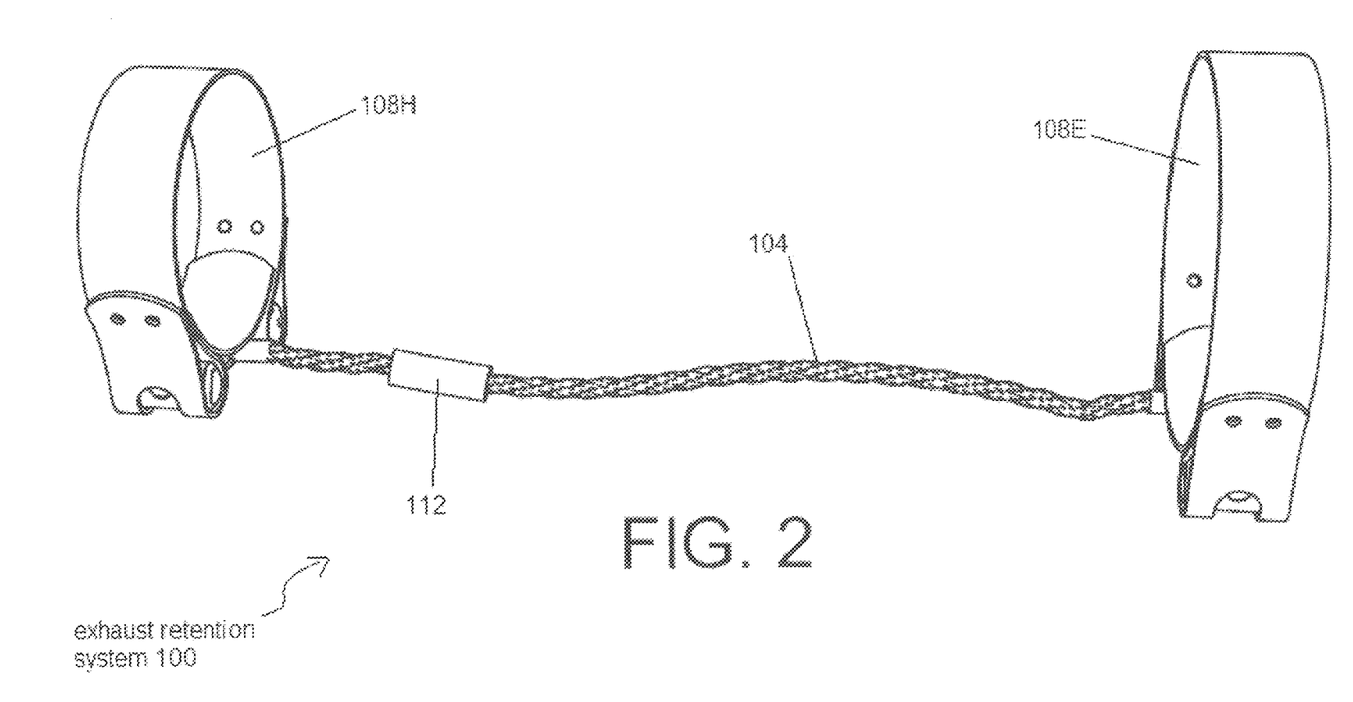
Figure 3:
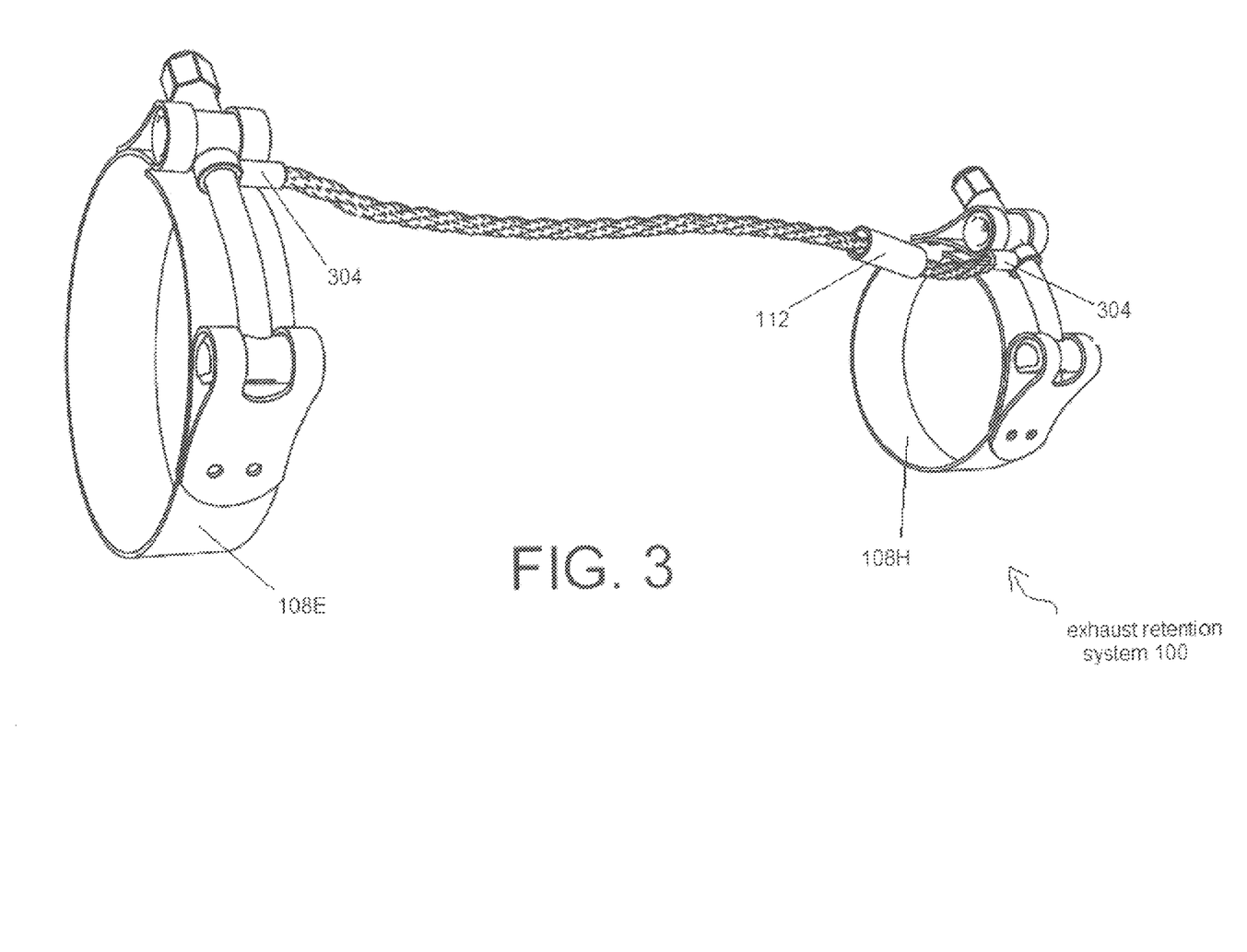
Figure 4:
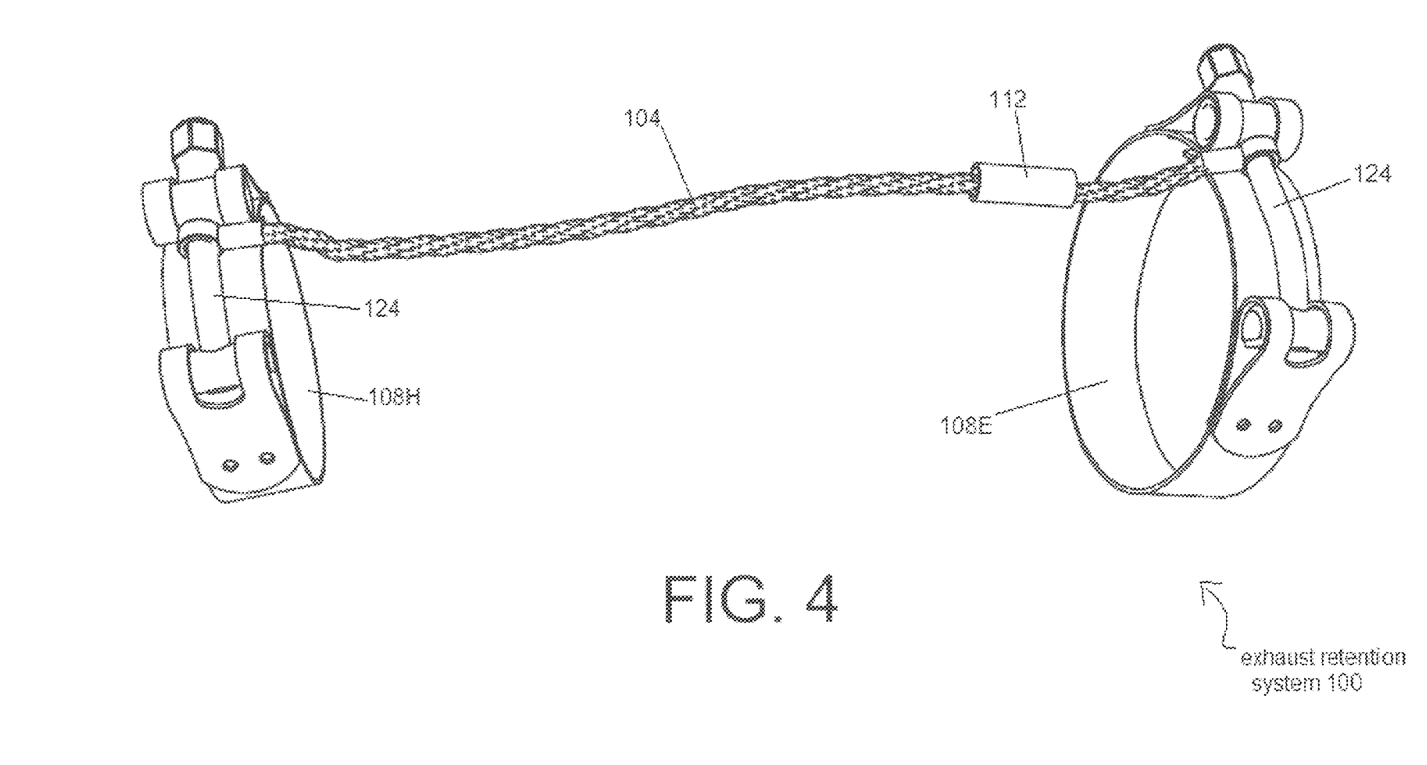
Figure 5:
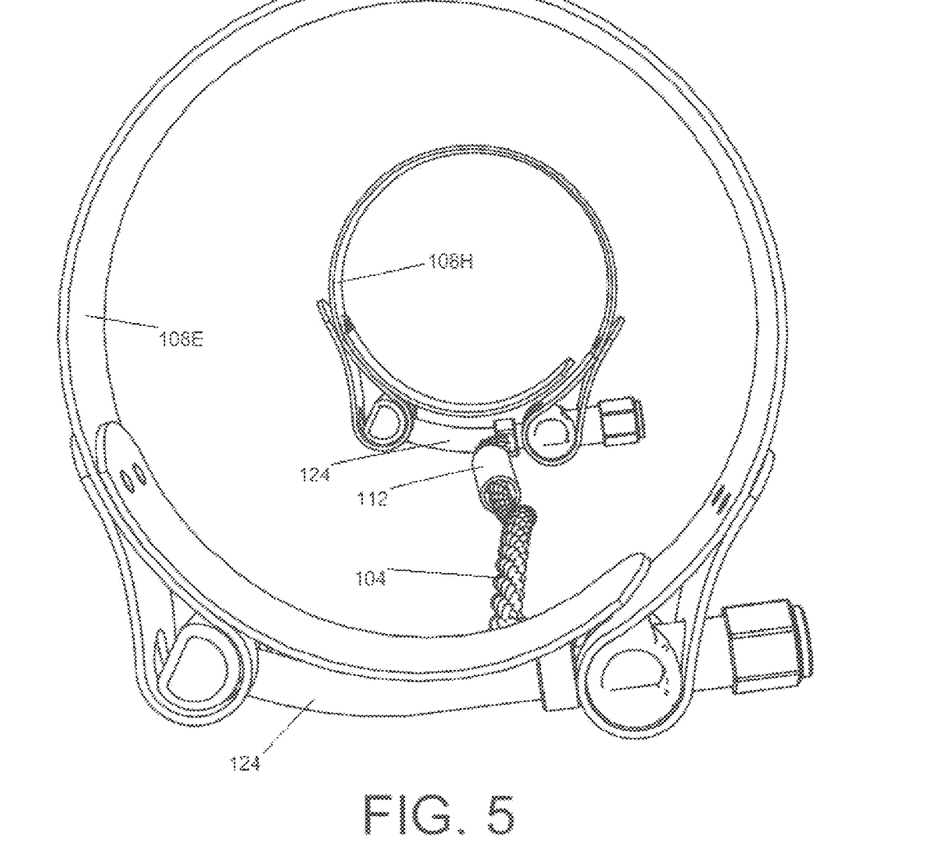
Figure 6:
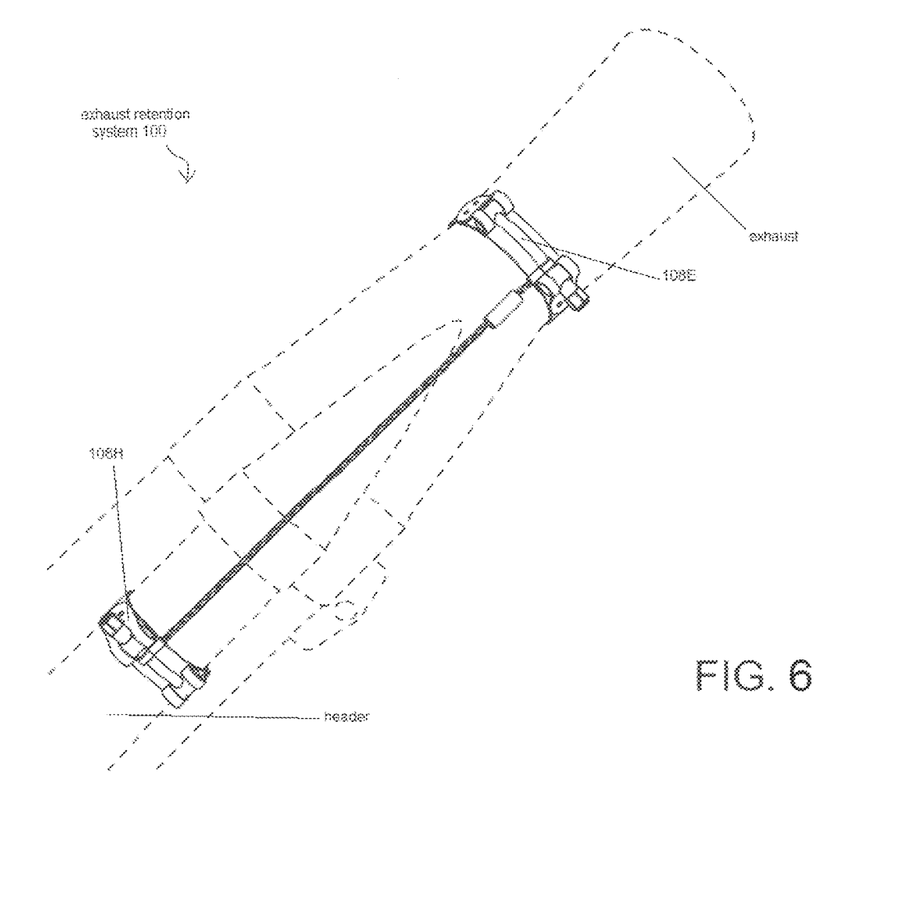
FIG. 6 shows the embodiment of FIGS. 1-5 attached between an exhaust and a header.

FIG. 6 shows an exemplary embodiment of an exhaust retention system 100 attached to both an exhaust and a header. For clarity, the exhaust and header are drawn in dashed lines.

The operating environment under which the embodiments disclosed herein will be used has significant heat and moisture, as well as changes in mechanical stress and size. Consequently, the various components which comprise the exhaust retention system 100 are made of materials that can withstand changes in both heat and humidity. For example, the cable 104 can be composed of stainless steel, although the embodiments herein are not limited thereto. Further, the bolts 124 (e.g. FIGS. 4-5) within the clamps 108 can be made of a specific material suitable for withstanding high temperatures.

Figure 7:
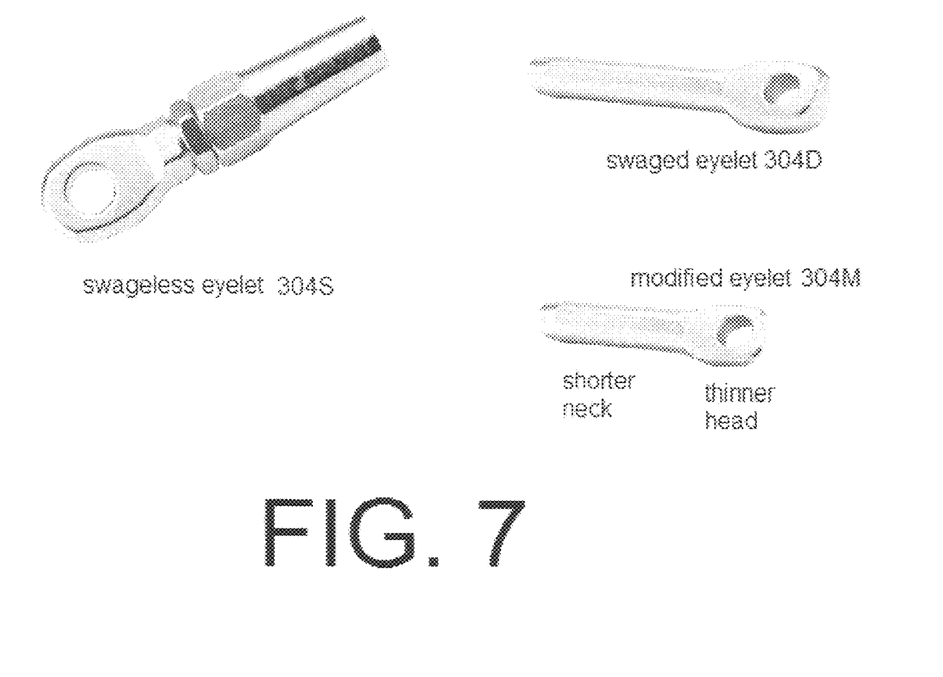
FIGS. 7-8 show detail about an eyelet used within the embodiments of FIGS. 1-6.
Figure 8:
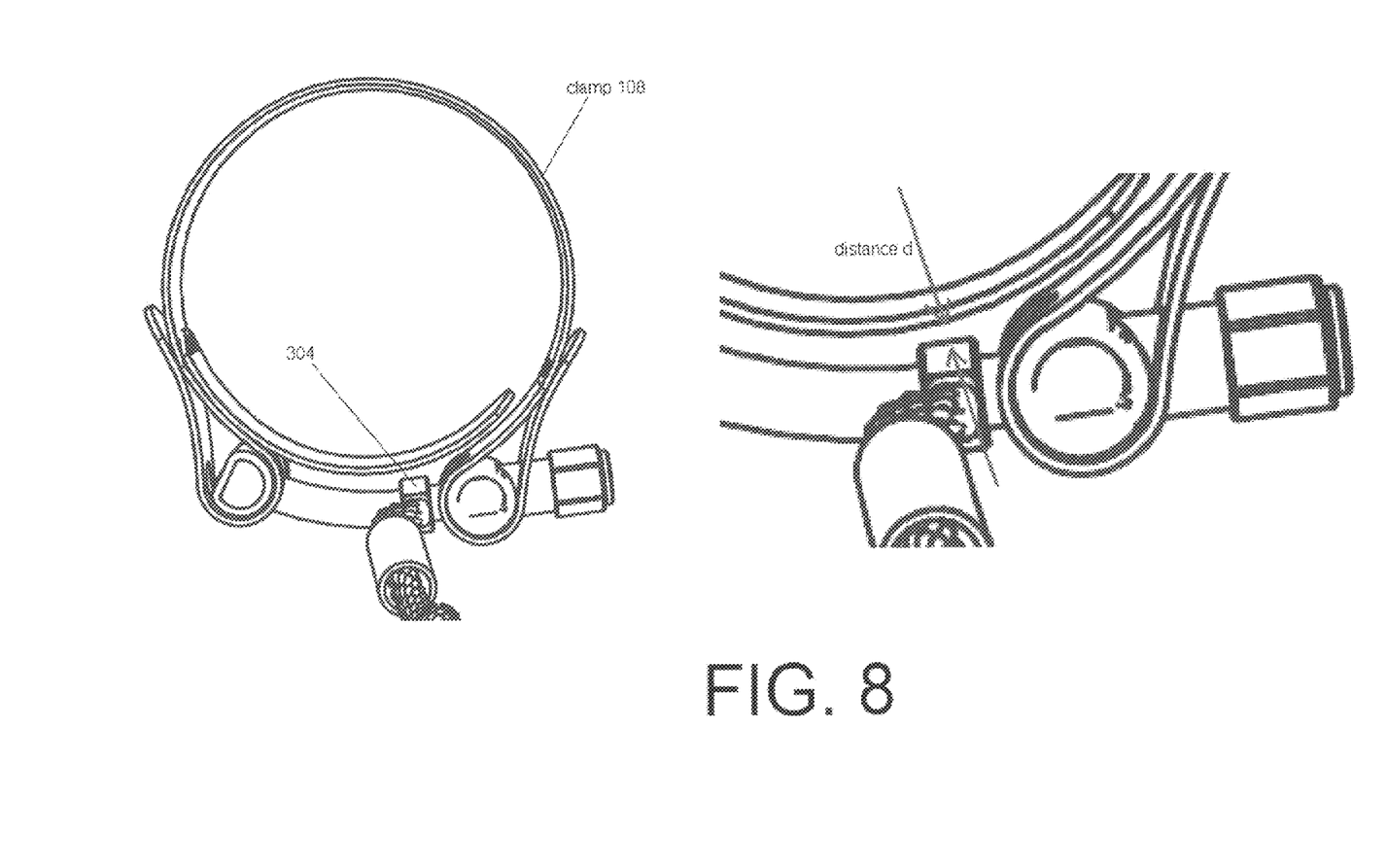

In an embodiment, the eyelet 304 (shown in FIGS. 3, 7, and 8) can be swaged or swageless. Further, as shown in FIG. 7, the swaged eyelet can be of a modified shape 304M that is machined to have a shorter neck and thinner head than other swaged eyelets, for increased flexibility during installation and use. As shown in FIG. 8, it is important to preserve the distance 'd', or installation problems could occur. An eyelet having a conventional neck-thickness could potentially interfere with installation.

Figure 9:
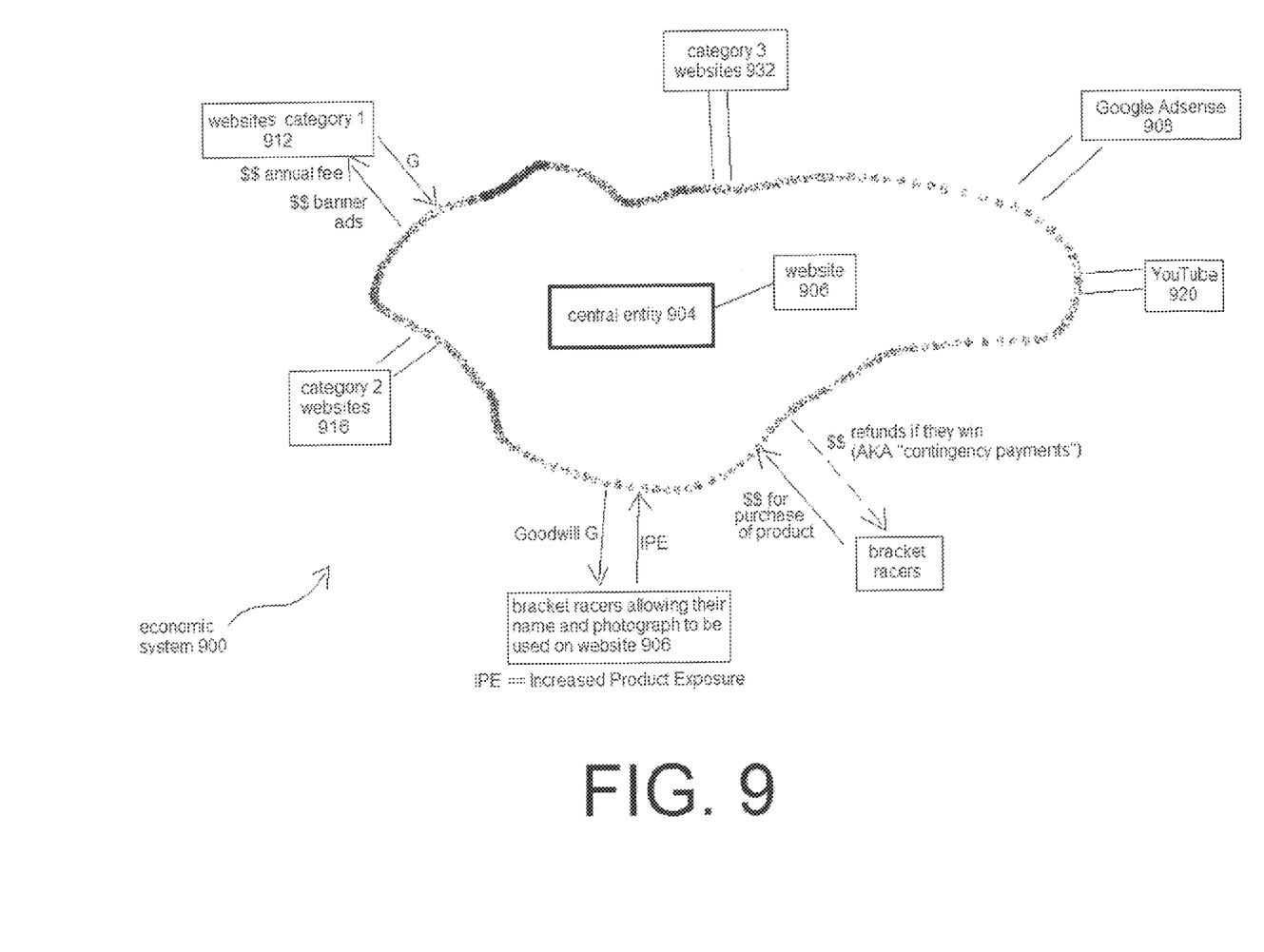
FIG. 9 shows an economic system for merchandising the exhaust retention system.

FIG. 9 shows an economic system 900 in which a central entity 904 engages in commercial transactions both using the Internet as well as conventional banking mechanisms. From FIG. 9 it is apparent that the central entity 904 participates with multiple categories of websites, as well as directly with bracket racers in multiple contexts. Further, the central entity 904 utilizes YouTube connections 920 and also Google Adsense 908 in various contexts, as will be discussed in more detail below.

Specifically, the category 1 websites are low-budget sites in which various sponsors, including but not limited to the central entity 904, pay for the site so that it remains free for its users. This establishes a sense of community and causes goodwill G to flow back to the central entity 904, as shown in FIG. 9.

Conversely, the central entity 904 does direct placement on category 2 websites. Category 2 websites are different than category 1 sites in that they may be for-profit, charge fees, or have some other self-sustaining mechanism that does not involve "sponsorship" per se, but instead more of a direct advertisement mechanism, AKA direct placement. Google Adsense campaigns are used with category 2 sites.

In an embodiment, the system 900 uses various terms, for example header tethers or exhaust tethers because of search engine optimization design of the website 906. The system 900 also employs YouTube and media articles focusing on the name of the product, e.g. Collector Tethers, and or the company name of the centralized entity 904.

The system 900 targets users by placement and budget and they show every day and populate as necessary to reach a specific click-thru budget. The click-thru budget can be altered and adjusted according to effectiveness.

As shown in FIG. 9, some bracket racers are given product in exchange for allowing their name to be used, and they also receive contingency payments if they win. Also as shown in FIG. 9, the economic system 900 pays to market products directly on category 3 reseller websites. These category 3 websites maintain their own inventory of product, takes credit cards directly, charges shipping and taxes, and consummate the entire purchase directly, without any involvement of the website 906.

The system 900 advertises and directly target placement with Google Ads on sites which show Google Adsense advertisements that are specific to the racers targeted as potential customers, in this case category 2.

YouTube videos were created for ranking and placement by Google when the product is searched to target customers. The videos are also embedded on the website 906 for marketing, and other websites for advertisement explaining the various products sold by the centralized entity 904, including what is included and how to install.

It is anticipated that various changes may be made in the arrangement and operation of the system of the present invention without departing from the spirit and scope of the invention, as defined by the following claims.

What is claimed is:

1. An exhaust retention system, comprising:
    a header clamp comprising a first circular section and a first bolt section, where the first bolt section has two parts which are secured to the first circular section at two separate locations which are not in contact with each other;
    an exhaust clamp comprising a second circular section and a second bolt section, where the second bolt section has two parts which are secured to the second circular section at two separate locations which are not in contact with each other, the exhaust clamp being connected to the header clamp by a cable;
    the cable having eyelets at both ends;
    a cylindrical sleeve, movably located along the axis of the cable; and
    the eyelet accommodating a bolt used for attaching the clamp.

2. The system of claim 1, further comprising:
    the eyelets being swaged eyelets.

3. The system of claim 1, further comprising:
    the eyelets being swageless eyelets.

4. The system of claim 1, further comprising:
    the eyelet having a neck-length and head-width conforming to predetermined requirements regarding a distance between the bolt and a surface of the clamp.

5. The system of claim 1, further comprising:
    the cylindrical sleeve having a surface usable for identifying a specific manufacturer of the system.

6. The system of claim 1, further comprising:
    a first bolt, having a threaded portion and a non-threaded portion, the first bolt passing through both portions of the first bolt section; and
    a second bolt, having a threaded portion and a non-threaded portion, the second bolt passing through both portions of the second bolt section.

7. The system of claim 6, further comprising:
    the respective eyelets being attached to the respective clamps by having the respective bolts pass through the respective eyelets.

8. The system of claim 7, further comprising:
    the respective eyelets being movable along the axis of the respective bolts.

9. The system of claim 6, further comprising:
    the first and second bolts being slightly curved at one end.

10. The system of claim 6, further comprising:
    the header clamp being a different diameter than the exhaust clamp.

11. The system of claim 1, further comprising:
    during use, a separation force applied to the cable occurs in a direction parallel to a center axis of the respective clamps.

12. The system of claim 1, further comprising:
    the system functioning within a high temperature environment, specifically the temperatures found underneath hot rod vehicles and the temperatures found near to a collector and an exhaust of a hot rod vehicle.

13. The system of claim 12, further comprising:
    the cylindrical sleeve has advertising, promotional, or other information imprinted thereupon, wherein the imprinting remains readable including at high temperature.

14. The system of claim 1, further comprising:
    the cylindrical sleeve has a non-slit unibody construction.

15. The system of claim 1, further comprising:
    the cylindrical sleeve is made of a specific color or dimension in order to quickly and visibly signify information to a user.

16. The system of claim 1, further comprising:
    the cables and clamps each respectively having a variety of sizes.

* * * * *